US012785332B2

(12) United States Patent
Baltruschat et al.

(10) Patent No.: US 12,785,332 B2
(45) Date of Patent: Nov. 3, 2026

(54) ELECTRIC SIGNAL DISTRIBUTING DEVICE

(71) Applicant: HARTING ELECTRONICS GMBH, Espelkamp (DE)

(72) Inventors: Luca Baltruschat, Minden (DE); Stephan Schreier, Rahden (DE)

(73) Assignee: HARTING ELECTRONICS GMBH, Espelkamp (DE)

( * ) Notice: Subject to any disclaimer, the term of this patent is extended or adjusted under 35 U.S.C. 154(b) by 370 days.

(21) Appl. No.: 18/692,774

(22) PCT Filed: Sep. 9, 2022

(86) PCT No.: PCT/DE2022/100668
§ 371 (c)(1),
(2) Date: Mar. 15, 2024

(87) PCT Pub. No.: WO2023/041110
PCT Pub. Date: Mar. 23, 2023

(65) Prior Publication Data

US 2025/0141159 A1 May 1, 2025

(30) Foreign Application Priority Data

Sep. 20, 2021 (DE) ..................... 10 2021 124 290.8

(51) Int. Cl.
*H01R 13/6587* (2011.01)
*H01R 13/6595* (2011.01)
(Continued)

(52) U.S. Cl.
CPC ..... *H01R 13/6587* (2013.01); *H01R 13/6595* (2013.01); *H01R 24/86* (2013.01); *H01R 2107/00* (2013.01)

(58) Field of Classification Search
CPC ........................ H01R 13/6595; H01R 13/6587
See application file for complete search history.

(56) References Cited

U.S. PATENT DOCUMENTS 4,983,785 A 1/1991 Johnston
7,491,081 B2 2/2009 Fehling et al.
(Continued)

FOREIGN PATENT DOCUMENTS

CN 208272259 U 12/2018
DE 29909127 U1 9/1999
(Continued)

OTHER PUBLICATIONS

European Patent Office, International Search Report and Written Opinion for International Application No. PCT/DE2022/100668, mailed Dec. 22, 2022, 14 pages (with English translation of International Search Report).
(Continued)

*Primary Examiner* — Phuong K Dinh
(74) *Attorney, Agent, or Firm* — Seed Intellectual Property Law Group LLP

(57) ABSTRACT

A signal distributing device is equipped with a plastic housing and is shielded as efficiently as reasonably possible. For this purpose, the plastic housing includes a device connection part having at least one cylindrical recess with a contact support arranged therein. A metal shielding sleeve with a self-tapping outer thread is screwed into the recess. A shielding housing is arranged in the interior of the plastic housing, enclosing a circuit support and electrically contacting the ground connection thereof, and is additionally connected to the shielding sleeve of the signal distributing device via an electrically conductive connection element, thereby maintaining a mechanical tolerance compensation.

15 Claims, 7 Drawing Sheets

(51) Int. Cl.
*H01R 24/86* (2011.01)
*H01R 107/00* (2006.01)

(56) References Cited

U.S. PATENT DOCUMENTS

| | | | | |
|---|---|---|---|---|
| 8,177,562 | B2 * | 5/2012 | Friedrich | H01R 13/6485 439/97 |
| 2008/0302557 | A1 | 12/2008 | Giefers | |
| 2010/0146182 | A1 | 6/2010 | Gutekunst et al. | |
| 2011/0143572 | A1 | 6/2011 | Friedrich | |
| 2019/0273343 | A1 | 9/2019 | Ruf et al. | |
| 2020/0235527 | A1 | 7/2020 | Eisfeld | |
| 2021/0151942 | A1 | 5/2021 | Dobler | |
| 2022/0393386 | A1 | 12/2022 | Lüttermann | |

FOREIGN PATENT DOCUMENTS

| | | | |
|---|---|---|---|
| DE | 20218223 | U1 | 4/2004 |
| DE | 102005062059 | A1 | 7/2007 |
| DE | 10 2008038589 | A1 | 2/2010 |
| DE | 202009010037 | U1 | 12/2010 |
| DE | 102008060006 | B4 | 4/2011 |
| DE | 102012022749 | A1 | 5/2013 |
| DE | 102015015202 | A1 | 5/2017 |
| DE | 102017123539 | B3 | 1/2019 |
| DE | 102019100073 | A1 | 7/2019 |
| DE | 102018104843 | A1 | 9/2019 |
| DE | 102020103896 | A1 | 5/2021 |
| DE | 102020112793 | A1 | 11/2021 |
| EP | 2980923 | A1 | 2/2016 |
| WO | 2013148063 | A1 | 10/2013 |
| WO | 2016155685 | A1 | 10/2016 |
| WO | 2020119854 | A1 | 6/2020 |

OTHER PUBLICATIONS

German Patent Office, Office Action for German application No. 10 2021 124 290.8 dated Jul. 14, 2022, 4 pages.

International Preliminary Report on Patentability, dated Mar. 26, 2024, for International Patent Application No. PCT/DE2022/100668. (8 pages).

* cited by examiner

ELECTRIC SIGNAL DISTRIBUTING DEVICE

BACKGROUND

Technical Field

The present disclosure relates to an electric signal distributing device.

The electric signal distributing device can be used to receive and/or process and/or transform and/or transmit analog and/or digital electrical signals. The electric signal distributing device may be a terminal for a data network, such as a so-called "I/O link module," which in the art is also referred to as "I/O terminal box," "I/O box," "field module" or "sensor/actuator box," or else an ethernet switch. The electric signal distributing device may connect field devices, such as sensors and actuators, which are connected thereto via plug-connector sockets, for example, to a controller via the data network.

Description of the Art

In terms of their structure and function in the network, I/O link modules are known from documents WO 2016/155685 A1 and DE 10 2008 060 006 B4.

The document DE 10 2018 104 843 A1 also proposes a grounding connection element for electrical grounding and/or electromagnetic shielding of electric components arranged in a plastics housing. The grounding connection element provides at least one electrical contact, which is guided outward with respect to the plastics housing, and is formed by a substantially helical, metallic insert part having a contact pin, which projects out of a helical region of the insert part and is arranged fixedly in an outwardly accessible, substantially cylindrical recess in the plastics housing. It is also disclosed to encapsulate the grounding connection element in the region of the recess in the plastics housing with plastic by injection molding, with at least part of the contact pin being kept unencapsulated.

However, this production method is very complex and the shielding relates only to the plug region, but not the region and in particular the signal paths inside the plastics housing. On the other hand, the use of a plastics housing is advantageous and desirable for reasons such as the flexibility of the shaping, leaktightness and inexpensive manufacture.

In the prior art, for such signal distributing devices which have a plastics housing, there is therefore a need for shielding which is as comprehensive and has as little complexity as possible.

A search by the German Patent and Trademark Office has found the following prior art in the priority application for the present application: DE 10 2018 104 843 A1 and EP 2 980 923 A1.

BRIEF SUMMARY

Embodiments of the present disclosure equip a signal distributing device, which has a plastics housing, with a shielding apparatus which is effective and easy to produce. Viewed from a somewhat different perspective, the present disclosure is about specifying a signal distributing device which is shielded as effectively as reasonably possible, has a plastics housing, and can be produced inexpensively.

The present disclosure may be summarized as including: an electric signal distributing device that may include the following components: a plastics housing, which may be produced by injection molding, and at least one plug-in connector socket, which has a contact carrier with at least one continuous contact chamber and also has at least one electric plug contact which is at least partially received in the at least one contact chamber of the contact carrier and retained therein, wherein the at least one plug-in contact has a plug-in-side end with a plug-in region for plug-in-side connection to a mating contact of a mating plug connector plugged in the respective plug-in connector socket and has a connection-side end with a connection region; a circuit carrier, which is arranged in the plastics housing and has at least one conductor track, which is electrically conductively connected to the connection region of the at least one plug-in contact; wherein the plastics housing has a device connection part, wherein the device connection part has at least one cylindrical recess, wherein the at least one cylindrical recess has an inside diameter, wherein the at least one contact carrier is arranged in the at least one cylindrical recess in the device connection part, and also a shielding unit, which includes the following components: at least one metallic shielding sleeve with a hollow-cylindrical basic shape having an outside diameter which substantially corresponds to the inside diameter of the cylindrical recesses; a shielding housing, which is arranged inside the plastics housing and encloses the circuit carrier, and at least one electrically conductive connecting element, which projects from the device connection part on the device inner side and electrically conductively connects the at least one shielding sleeve to the shielding housing.

The plastics housing together with the shielding unit forms a shielded device housing.

The circuit carrier may be a printed circuit board, which advantageously can be produced inexpensively in series production and can be easily processed.

In some embodiments, the plug-in contact of the plug-in connector socket may be a socket contact, that is a plug-in contact with a plug-in region which is in the form of a socket, such as having a hollow-cylindrical form.

The present disclosure has the advantage that the manufacture of the shielded device housing of a signal distributing device is made easier.

It is advantageous that the housing design of an unshielded signal distributing device can be maintained and it is substantially only necessary to supplement it with the components of the shielding unit in order to obtain the effectively shielded device housing. This maintains the advantages of using a plastics housing, for example flexible shaping, such as by injection molding, high leaktightness, which plays an important role in the event of use in the field, and can be produced inexpensively, such as in high numbers.

In at least one embodiment, the shielding sleeve has an internal thread for making it possible to screw the shielding sleeve into the respective mating plug connector, which has an external thread, to lock a common plug-in connection in the plugged-in state.

As an alternative or in addition, the shielding sleeve may have an undercut in the form of a plug-in-side, inwardly directed encircling latching edge. This latching edge serves to latch a mating plug connector, which has outwardly directed latching hooks.

In some embodiments, the shielding sleeve may have both the internal thread and the latching edge, as a result of which it can be plugged selectively both in a mating plug connector that has a screw thread and in a mating plug connector that has outwardly directed latching hooks. This is advantageous because the plug-in compatibility of the electric signal distributing device is increased as a result.

In some embodiments, the mating plug connector that has outwardly directed latching hooks may be what is referred to as an "inverse push-pull plug-in connector," in the case of which the latching hooks can be actuated to release it from a release sleeve which is displaceable counter to the plug-in direction.

Advantageously, the shielding sleeve, which is metallic and may be made of brass, also enables excellent shielding of the particularly sensitive plug-in region of the plug-in connector socket.

The production of the plastics housing, such as the device connection part, is made considerably easier by the use of the shielding sleeve, since it is not necessary to form an undercut while it is being produced to form the latching lug in the plastics material, such as by injection molding. Lastly, such an undercut of plastic can only be created with great difficulty in the injection molding processes which are conventional for this and otherwise are very advantageous.

In some embodiments, the shielding sleeve may have a self-tapping external thread. This makes it possible to mount the shielding sleeve in the device connection part with only little complexity, specifically to screw it in self-tapping fashion into the respective cylindrical plug receptacle in the device connection part, wherein the self-tapping thread of the shielding sleeve automatically taps a mating thread into the plastics material of the device connection part that surrounds the plug receptacle, that is into the plug receptacle. This self-tapping screwing-in operation constitutes a considerable reduction in workload compared to a much more complex procedure of encapsulation by injection molding and also makes it possible to retrofit unshielded plastics housings irrespective of the respective thread sizes.

The present disclosure has the further advantage that the latching lug of the shielding sleeve is stable and as a result withstands particularly high tensile forces by virtue of the metallic material, such as brass, of which the shielding sleeve consists.

At the same time, the present disclosure has the further advantage that the shielding sleeve, and its latching lug, has a compact structure.

The present disclosure has the additional advantage that, by virtue of its metallic material, the latching lug can have a narrow form, such as in the plug-in direction and/or perpendicular thereto, and has high stability. As a result, valuable structural space is saved and the desired compact structure is enabled inside the shielding sleeve and thus also in the plug-in connector socket which comprises it. It is also possible for the latching hooks of the latching plug connector that is to be plugged in therewith to have small dimensions.

Another advantage is that the shielding sleeve, for reasons of compatibility, is also suitable for conventional screwed connection of a mating plug connector in the form of a screw- and plug-type connector, which to this end has an external thread corresponding to the internal thread of the shielding sleeve, and also has great stability with respect to this screwed connection owing to its metallic material.

A further advantage of the shielding sleeve is that the metal, such as the brass material, of which the shielding sleeve consists is more resistant than the plastics material of the housing connection part. As a result, not only is the retaining force of the latching lug increased, but moreover the production of such a plastics housing fitted with built-in sockets is also made easier. The mounting of such shielding sleeves into the device connection part of the plastics housing is made considerably easier by the self-tapping ability of the shielding sleeve to be screwed into its plastics material.

The use of the self-tapping thread also means that a union nut for screwing a wall leadthrough to an external thread portion which projects from the plastics housing, such as from the device connection part, on the plug-in side, is not required.

Advantageously, this makes it possible to fit the shielding sleeve in the device connection part in completely recessed fashion, and an external thread portion of the shielding sleeve does not need to project from the housing wall on the plug-in side for screwed connection by a union nut—which is thus advantageously not necessary when the shielding sleeve is used—as is otherwise conventional in the prior art. This saves some space both in the plug-in direction and perpendicular thereto and saves on a part which can be lost.

A further advantage of the recessed fitting of the shielding sleeve also results from the conventional use in practice of the already mentioned I/O connection boxes, which are frequently also (verbally abbreviatedly) referred to as "I/O boxes" in the field of automation technology. In this technical field, specifically, it has been routine for some time to use this to characterize the function of the built-in sockets (inputs, outputs, looped-through signals, etc.) and to identify whether the respective built-in socket is installed in recessed fashion or not. For pure screw- and plug-type connectors, up to now this was unproblematic. In combination with modern latching plug connectors, such as the already mentioned "push-pull plug connectors," the additional desire for compatibility with the screw locking means routine up to now and the necessity of the recessed fitting result in new challenges, which are solved advantageously by the already mentioned advantages of the shielding sleeve.

It is also advantageous that the shielding sleeve, as component of the shielding device, has a shielding action against external electrical and magnetic fields owing to its metallic material, such as its brass material. The shielding sleeve thus shields the plug-in contacts arranged or to be arranged therein against the external fields, even if the device connection part in which it is fitted consists of plastic. This shielding action can relate to socket contacts and to pin contacts to be plugged therein. This is advantageous because, as a result, the plastics housing, such as connection boxes naturally having a large number of plug-in connections, which can be produced inexpensively and with low complexity and also adapted to requirements of the respective application very flexibly in terms of their shape, can have good shielding to an enhanced extent in its particularly sensitive plug-in regions to avoid mutual crosstalk and against external electrical and/or magnetic fields.

In some embodiments, some of the shielding sleeves or all the shielding sleeves of the shielding unit are electrically conductively connected to the shielding housing and also to one another in the form of an earth connection. In at least one embodiment, an external earth connection, for example a screw contact, may additionally be provided on the shielding unit and electrically conductively connected thereto. As an alternative or in addition, the earth connection may be effected via the shield and/or earth connection of the mating plug connector plugged in the respective shielding sleeve.

In one embodiment, the shielding housing has a substantially hollow-cylindrical basic shape. This is advantageous because, as a result, the hollow-cylindrical basic shape is matched expediently and in material-saving fashion to the necessarily round shape of its internal and external thread.

Advantageously, the shielding sleeve may have a continuous, in some embodiments substantially cylindrical, cavity as receiving region for receiving a plug-in region of a mating plug connector plugged or to be plugged therein. The internal thread may be arranged on the inside of an internal thread portion, which slightly tapers the cavity, of the receiving region. Even though the receiving region tapers in this portion, the shielding sleeve keeps its substantially hollow-cylindrical basic shape even in this internal thread portion. The term “substantially hollow-cylindrical” thus includes, among other things, a hollow-cylindrical main body with the external, self-tapping thread, the inner screw thread, such as in the tapering internal thread portion, the plug-in-side latching lug, and also the plug-in-side conical attachment and, at the opposite end, also the encircling bevel.

In some embodiments, the internal thread may be a metric thread such as an M12 thread, which, in accordance with standards, is compatible with the M12 screw- and plug-type connectors routine for the applications described in the introduction.

In one embodiment, the shielding sleeve may be a turned part. This means that the shielding sleeve is produced in a turning process, such as a CNC (“computerized numerical control”) turning process. The CNC process has the advantage that details such as the external and internal radii, the length and the thread depth of the self-tapping external thread and the internal thread provided for the screwed connection of the screw- and plug-type connector can be easily adapted to the respective requirements of the device structure and the shielding sleeves can be produced in automated fashion and inexpensively even in small series. The undercut of the shielding sleeve that forms the latching lug can be produced with considerably less complexity by turning than by injection molding.

In one embodiment, the shielding sleeve has an encircling attachment, which conically widens at least in its outer contour toward the plug-in-side end of the shielding sleeve, on its plug-in-side end portion of the shielding sleeve. The shielding sleeve serves to close the thread which is tapped or to be tapped in the device connection part by the sleeve and is suitable for terminating flush with the device connection part at a plug-in-side end face of the shielding sleeve, as a result of which the shielding sleeve can be fitted in recessed fashion in the device connection part.

At the shielding sleeves opposite, that is device-side, end to the plug-in side, the shielding sleeve may have an encircling external bevel, that is an encircling external inclined portion, which, when the shielding sleeve is being inserted into the cylindrical recess in the device connection part, has a self-centering action, since the shielding sleeve self-centers therein during the fitting operation into the cylindrical recess. This additionally enhances the advantage of the simplified production of the device.

In one embodiment, the shielding sleeve may be substantially hollow-cylindrical.

The metallic shielding sleeve may consist of a copper alloy, such as of brass.

The shielding sleeve may be formed in one piece.

As already specified, in one embodiment the contact carriers may be formed in one piece together with the device connection part, for example in the form of a single, common injection molded part.

In an alternative embodiment, the contact carrier may be arranged “floating” in the shielding sleeve, and thus project into the shielding sleeve without, however, being directly fastened to the shielding sleeve. This has the advantage that the device/the plastics housing can be constructed irrespective of design-determined manufacturing tolerances of its components without resulting mechanical stresses and as a result the construction is further simplified. The respective contact carrier may thus be a separate part which can be fastened, for example on the circuit carrier.

The shielding unit of the signal distribution device has a shielding housing, which may be substantially closed on all sides, where the term “substantially closed on all sides” implies that cables, for example signal lines, connecting regions of the plug-in contacts, etc., can be guided through.

The shielding housing is arranged inside the plastics housing and encloses the circuit carrier, which is in the form of a printed circuit board, in order to shield it.

To this end, the shielding housing may have a multi-part, that is at least two-part, or in some embodiments three-part, form and have for example, a separate bottom part and a separate cover, between which the circuit carrier, such as the printed circuit board, is arranged. As a third part, the shielding housing may, for example, additionally have a separate shielding housing attachment which constitutes a mechanical connection to the plastics housing. Those skilled in the art will understand from the above wording (“at least two-part, or three-part”) that thus four-, five-, six-, . . . , n-part is also disclosed, and for example, a one-part embodiment is also possible owing to the flexibility of the material. During the mounting, it is possible to insert the printed circuit board into the bottom part and the cover can be placed on—in the event of a one-part embodiment bent over—the bottom part. Both the bottom part and the cover can have a respective rectangular basic area, the length and width of which each exceed the length and width of the circuit carrier, such as the printed circuit board. The respective basic area may have a respective periphery, bent at right angles thereto, at one or more, such as all, edges, as a result of which, in the assembled state, ideally an encircling frame is produced, as a result of which the circuit carrier, such as the printed circuit board, is enclosed substantially on all sides for effective shielding.

Openings for optional supply lines may be present in the cover or in the frame. The cover may have leadthrough openings for the plug-in regions of the plug-in contacts and also provide connection options, for example in each case one or more contacting slots, for an electrical connection to the respective connecting element.

As already mentioned, the shielding housing is electrically conductively connected to at least one, in some embodiments multiple, all shielding sleeves via the respective electrically conductive connecting element. Inside the device, therefore, at least one connecting element is in electrical contact with the shielding housing at least at one point, for example by it having at least one contact tab, which can be plugged, for example, through the contacting opening in the shielding housing and form- and force-fittingly retained therein and thus electrically conductively connected thereto. This has the advantage of variable plug-in depth, which are present to the necessary extent for component-related tolerance compensation. As an alternative or in addition, the contact tab may also be screwed or soldered to the shielding housing, this benefiting the quality and/or reliability of the electrical contact but adversely affecting the aforementioned tolerance compensation. The respective connecting element is electrically conductively connected to the respective shielding sleeve in or on the device connection part, such as in the respective cylindrical plug receptacle.

In some embodiments, the multiple contact carriers may substantially each be cylindrical. In some embodiments, the contact carriers may have a diameter which is smaller than the inside diameter of the cylindrical recesses.

In some embodiments, the respective contact carrier can then be arranged concentrically inside the respective cylindrical recess in the device connection part in recessed fashion. For example, the respective contact carrier may be connected to the device connection part via a connecting piece which is integrally molded on the contact carrier on the inside in encircling fashion at the device-side end of the cylindrical recess and is annular, and retained on the housing connection part by this connecting piece.

Advantageously, the entire device connection part together with the contact carriers can be produced as a one-piece injection molded part, such as in a single injection molding procedure.

The electrically conductive connecting element may be a stamped and bent part, which has a planar, closed contact ring, on which at least one contact tab is arranged and is bent out of the ring plane. In some embodiments, multiple, for example four, contact tabs may be arranged on the contact ring on the outside, such as at equidistant intervals. The contact tabs may be formed in one piece with the contact ring. During the production, they may be stamped out from a metal sheet, for example in one method step together with the contact ring, such as in a single stamping procedure, and subsequently bent out of the ring plane in a further step.

The contact ring of the connecting element may have an outside diameter which is smaller than the diameter of the cylindrical recess and may also have an inside diameter which is larger than the diameter of the cylindrical contact carrier. This makes it possible to arrange the connecting element with its contact ring on the connecting piece and to thus retain the connecting element form-fittingly between the outer wall of the cylindrical recess and the cylindrical contact carrier on the device connection part in the respective cylindrical recess.

In the encircling connecting piece, the device connection part may have connection through-openings for guiding through said contact tabs of the connecting element. When the contact ring of the connecting element is form-fittingly inserted in the respective cylindrical recess, its contact tabs thus project through the connection openings and can thus make electrical contact with the shielding housing. The respective contact tab may be plugged through the contacting slots in the cover of the shielding housing and be form- and force-fittingly retained therein. In addition or as an alternative, a soldered connection or a screwed connection may also be performed at this point.

The contact carriers are a component of round plug-in connectors in this case. The round plug-in connectors may be what are referred to as "M12" round plug-in connectors, but other round plug-in connectors with different thread sizes, for example, what are referred to as "M8" round plug-in connectors, may also be used.

The designation "M8" means that the locking mechanism of this round plug-in connector is what is referred to as a "metric" screwing-in thread, it being possible to denominate the diameter of the respective screwing-in thread in metric units (in this case millimeters) in whole numbers. An M12 thread is distinguished, for example, in that its diameter is 12 mm and an M8 thread is distinguished in that its diameter is 8 mm.

However, other round plug-in connectors with screwing-in threads of different diameters, which may, for example, also be reported in inches, may also be used.

A X-shaped (that is "cruciform") or Y-shaped receptacle for a correspondingly X- or Y-shaped shielding element may be provided in at least one or else multiple, such as all, contact carriers. In the case of an X shape, the shielding element is what is referred to as a "shielding cross."

These two types of shielding elements are well known to those skilled in the art. In the case of an X-shaped shielding element, the shielding cross usually has four shielding walls, which are arranged symmetrically in relation to one another and as viewed in cross section, form a respective right angle in relation to their adjacent shielding wall and have a common axis of intersection, which usually extends in the plug-in direction. In the case of a Y-shaped shielding element, by contrast, two shielding walls form a acute angle and the third shielding wall forms the same angle in relation to each of the other walls, that is to say is arranged symmetrically in relation thereto.

The respective shielding element is then likewise a component of the shielding unit, may consist of metal, such as a metal alloy such as a zinc alloy and/or an aluminum alloy, and may for example, be produced by die casting, such as by zinc and/or aluminum die casting. The contact carriers, which have, for example, such a cruciform receptacle for inserting an X-encoded shielding element, are accordingly subdivided into four segments such as of the same size, each one of which may have two contact chambers in each case, for example, for receiving two plug-in contacts in each case, which together serve to transmit a differential signal. The respective shielding element, for example, the shielding cross, may be grounded via the connecting element on the shielding housing.

In some embodiments, this grounding of the shielding cross may be realized in that the shielding cross forms a connecting portion which makes electrical contact with the connecting element. This has the advantage that the structure is made even more simple.

As an alternative or in addition, the shielding cross itself may have such a direct connection to the shielding housing. For example, the shielding cross may have a contact pin which projects beyond the shielding cross on the device side. The device connection part may have at least one through-opening for a respective contact pin in the cylindrical recess. Moreover, the contact carrier may be segmented, for example by two slots arranged cruciformly in relation to one another, in order to receive a metallic shielding element, for example a shielding cross. The device connection part may have a through-opening for the shielding element or at least part of it, through which through-opening the shielding element can be guided, for example, by an earthing pin, in order to make electrical contact with an earth connection of the printed circuit board.

Adaptations may be made to the device connection part for various types of plug-in connectors to be integrated, for example, snap-action hooks for contact carriers for two-pole ethernet connections.

BRIEF DESCRIPTION OF THE SEVERAL VIEWS OF THE DRAWINGS

An embodiment of the disclosure is illustrated in the drawings and will be explained in more detail below.

The figures may contain partially simplified, schematic illustrations. To some extent, identical reference signs are used for elements that are similar but might not be identical. Different views of the same elements may be drawn to different scales.

DETAILED DESCRIPTION

Figure 1A:
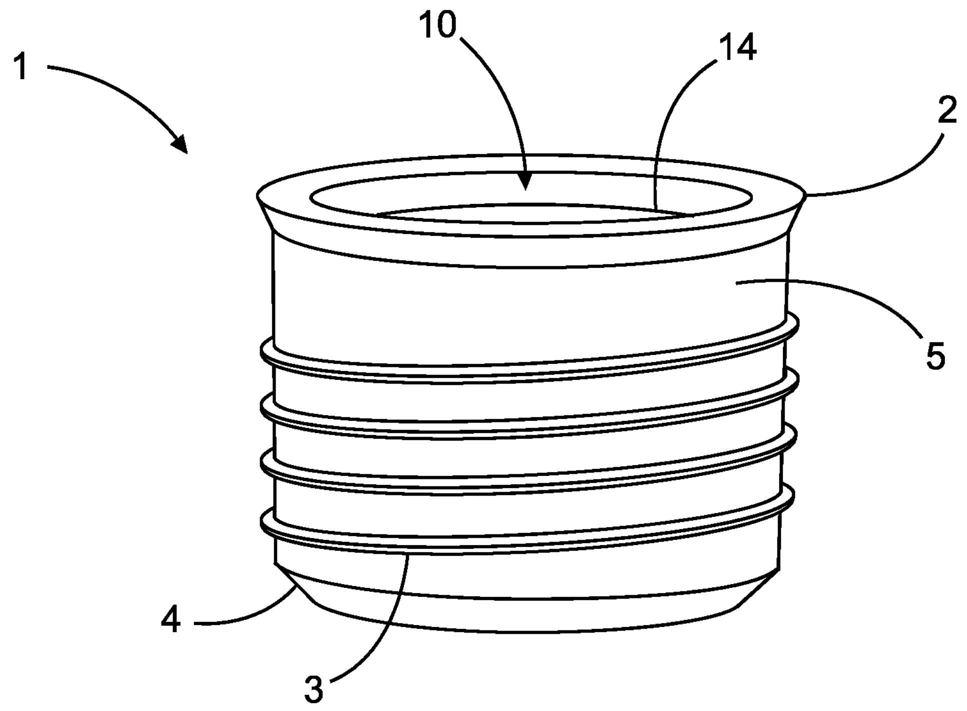
FIG. 1*a* shows a 3D illustration of a substantially hollow-cylindrical shielding sleeve with a self-tapping external thread.

FIG. 1*a* shows a substantially hollow-cylindrical shielding sleeve 1, which has a substantially hollow-cylindrical main body 5 with a self-tapping external thread 3. The shielding sleeve 1 has an encircling attachment 2, which conically widens at least in its outer contour toward the plug-in-side end, on its plug-in-side end portion at its plug-in-side end, illustrated at the top in the drawing. Furthermore, a slight funnel-shaped inner contour (not denoted in more detail) with an adjoining undercut can also be seen at the plug-in-side end, the undercut forming an encircling latching lug 14. This encircling latching lug 14 serves to latch a latching plug, which is to be inserted from the plug-in side (that is from the top in the drawing) and may have, for example, concentrically outwardly directed latching hooks, which in the latched state engage in the latching lug 14 from the inside.

At an end of the substantially hollow-cylindrical shielding sleeve 1 opposite the plug-in side, this end being illustrated at the bottom in the drawing, the substantially hollow-cylindrical shielding sleeve 1 has an encircling external bevel 4 for self-centering when being screwed into a cylindrical recess 60 in a device connection part 6 that is shown below, for example, the device connection part 6 of a device housing.

Figure 1B:
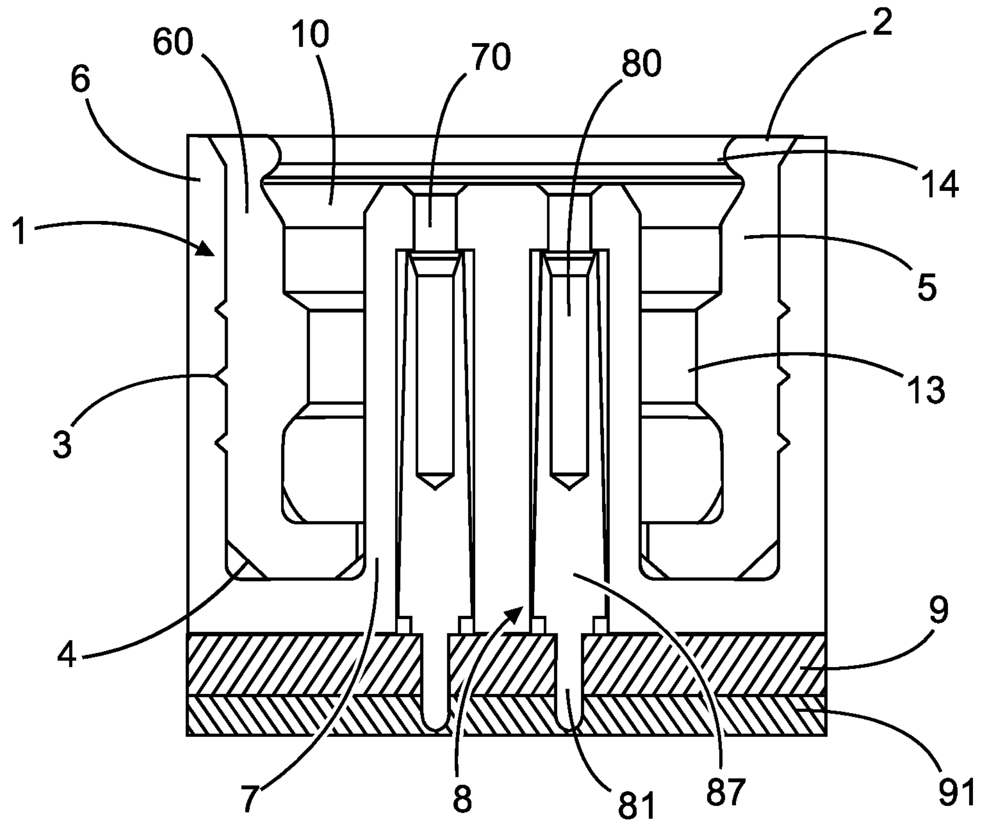
FIG. 1*b* shows a cross-sectional illustration of a plug-in connector socket which has the shielding sleeve screwed in a device connection part, a contact carrier and plug-in contacts.

As can be clearly seen in FIG. 1*b*, the shielding sleeve 1 has a continuous cavity 10 as a receiving region. The shielding sleeve 1 has an internal thread portion 13, which tapers the cavity 10, inside this cavity 10, which is substantially cylindrical. The internal thread portion 13 is arranged on the connection side of, that is to say underneath in the drawing, the latching lug 14. Worded in reverse, the latching lug 14 is arranged on the plug-in side of the internal thread portion 13, that is to say above the internal thread portion 13 in the drawing. The internal thread portion 13 has an internal thread, (not illustrated in the drawing), for on the plug-in side screwing in a screw- and plug-type connector, (likewise not shown), which is to be inserted from the plug-in side (that is from the top in the drawing). For example, but not limitingly, the internal thread can be a metric thread, such as an M12 thread, with the result that a matching metric screw- and plug-type connector that is in accordance with standards, such as an M12 screw- and plug-type connector, that matches it can be plugged into the shielding sleeve 1 and screwed to its internal thread.

Therefore, the shielding sleeve 1 is suitable both for receiving and locking a latching plug connector and for receiving and locking a screw- and plug-type connector.

The self-tapping external thread 3 of the shielding sleeve 1 serves to fit the shielding sleeve 1 in the already mentioned cylindrical recess 60 of the device connection part 6. To this end, the shielding sleeve 1 consists of metal, for example pf brass, and may be manufactured by turning. During the aforementioned fitting, the self-tapping external thread 3 of the shielding sleeve 1 taps a mating thread into the cylindrical recess 60, that is into the plastics material of the device connection part 6 that surrounds the cylindrical recess 60.

In the example shown here, the device connection part 6 is formed in one piece with a contact carrier 7, the contact carrier 7 projecting into the cavity 10 of the shielding sleeve 1. For example, the device connection part 6 may be produced together with the contact carrier 7 in the form of an injection molded part in a common injection molding process. This contact carrier 7 has multiple through-openings in the form of contact chambers 70, in each of which a plug-in contact 8 is received. Each plug-in contact 8 has a plug-in region 80 and a connection region 81 and also a retaining portion in between, by which it is retained on the contact carrier 7. The plug-in contacts 8 illustrated here are socket contacts, since their plug-in region 80 is socket-shaped. On the connection side, that is illustrated at the bottom in the drawing, its pin-shaped connection region 81 projects through contact openings in a printed circuit board 9 and is electrically conductively connected, for example soldered, at the back to a conductor track 91 located there.

Figure 2:
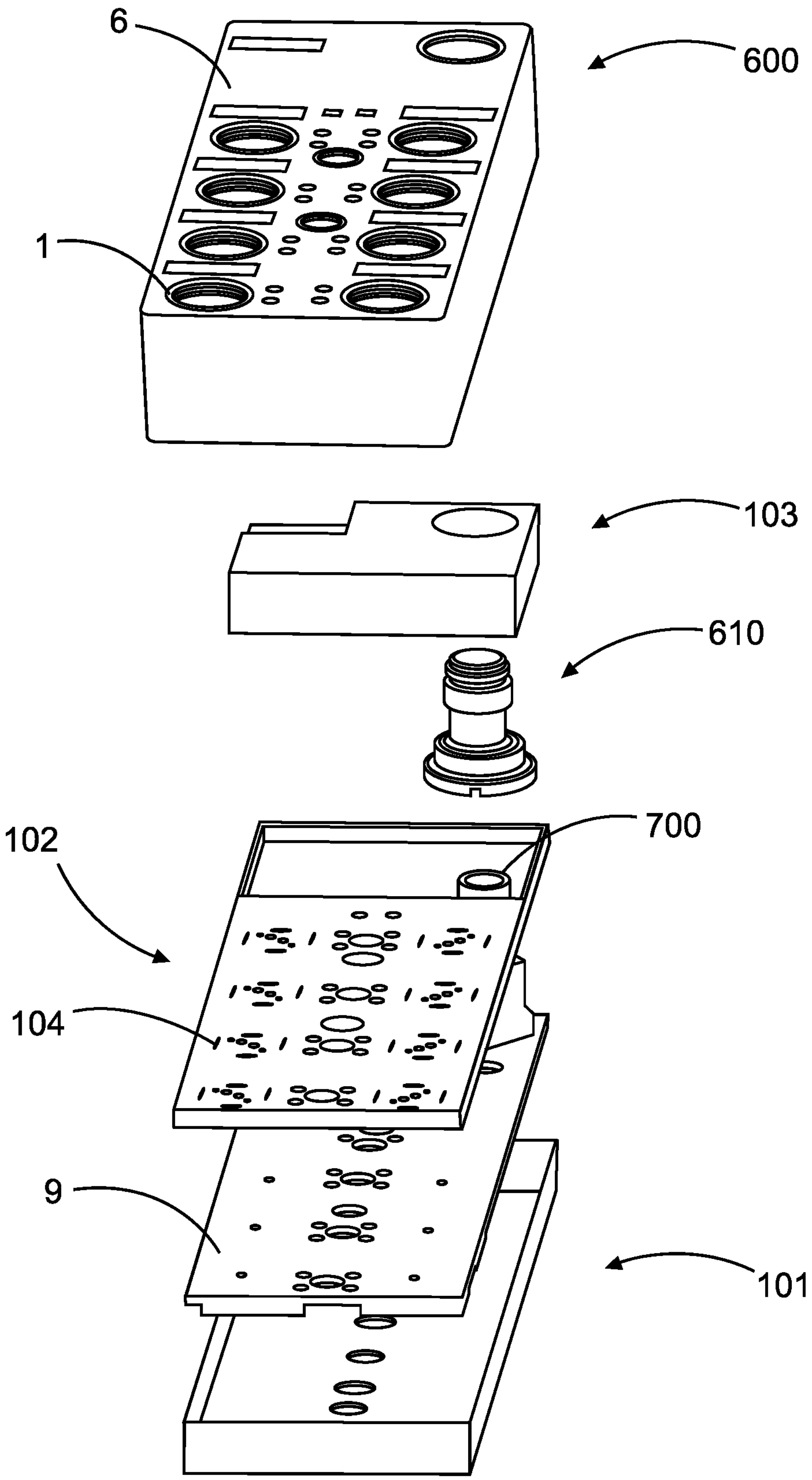
FIG. 2 shows an exploded illustration of a signal distributing device with eight plug-in connector sockets.

FIG. 2 shows an exploded illustration of a signal distributing device with a plastics housing 600 and eight plug-in connector sockets. The signal distributing device has a device connection part 6 with eight cylindrical recesses 60, in which a respective shielding sleeve 1 is screwed in self-tapping fashion.

The signal distributing device also has a printed circuit board 9. In the mounted state, this printed circuit board 9 is surrounded by a shielding housing 100, which is denoted explicitly in FIG. 4*a*. The shielding housing 100 has a bottom part 101, a cover 102 with multiple openings, not denoted in more detail, and contacting slots 107. The shielding housing 100 also has a shielding housing attachment 103, which serves for mechanical connection to the plastics housing 600. The shielding housing attachment 103 has a leadthrough, not denoted in more detail, for an adapter element 610, which surrounds the power connection 700 in the mounted state.

Figure 3A:
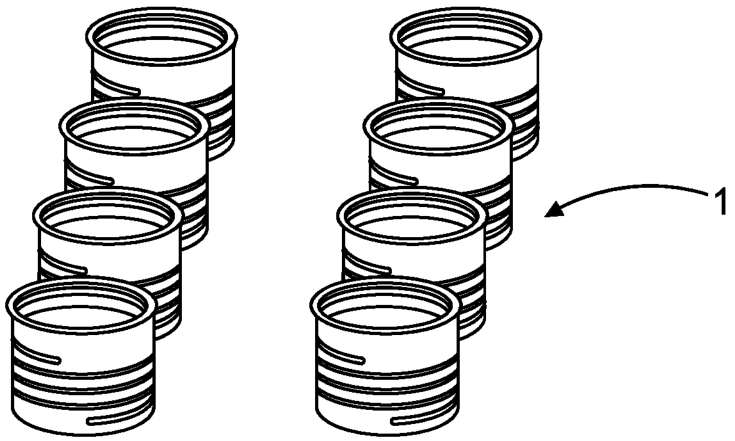
FIG. 3*a* shows a group of eight shielding sleeves.
Figure 3B:
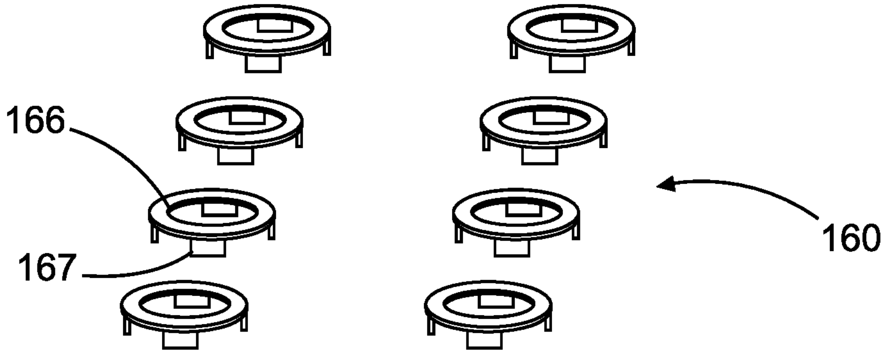
FIG. 3*b* shows a group of eight connecting elements.

FIG. 3*a* shows a group of eight shielding sleeves 1, which are intended for screwing into the cylindrical recesses 60 in the device connection part 6, after the eight connecting elements shown in FIG. 3*b* have been inserted into these cylindrical recesses 60.

Figure 3C:
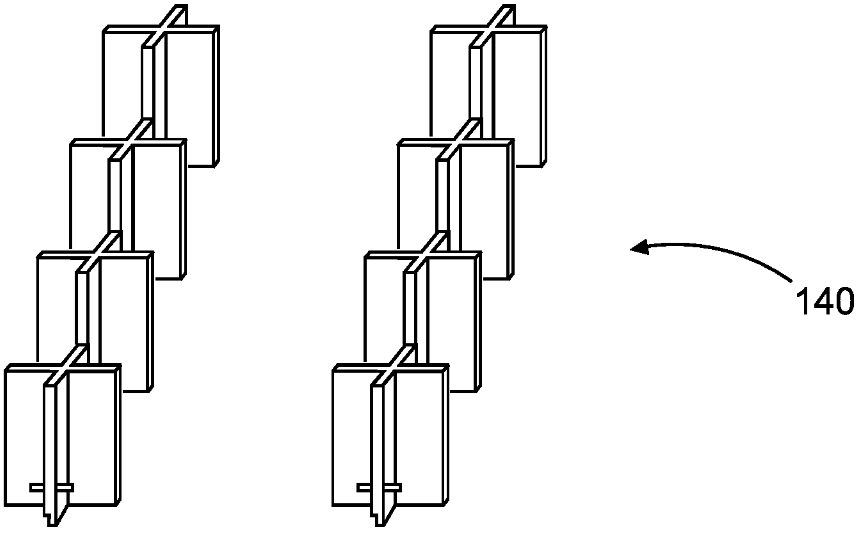
FIG. 3*c* shows a group of eight shielding crosses.
Figure 5A:
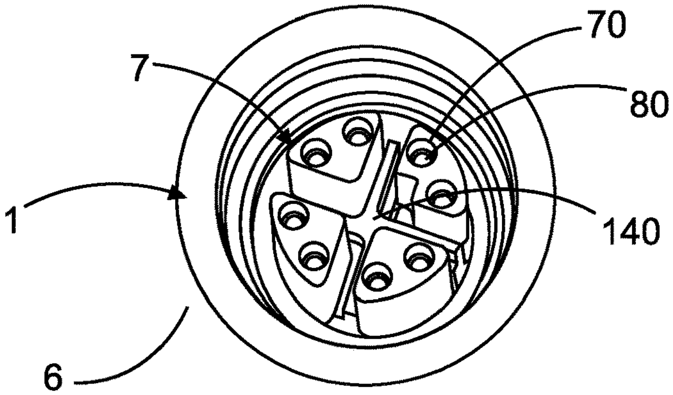
FIG. 5*a* shows a plug-in-side view of a device connection part of the plastics housing with a plug-in connector socket.

FIG. 3*c* shows a group of eight shielding crosses 140, which are each intended for arrangement in the segmented contact carrier 7, as illustrated, for example, in FIG. 5*a*.

Figure 4A:
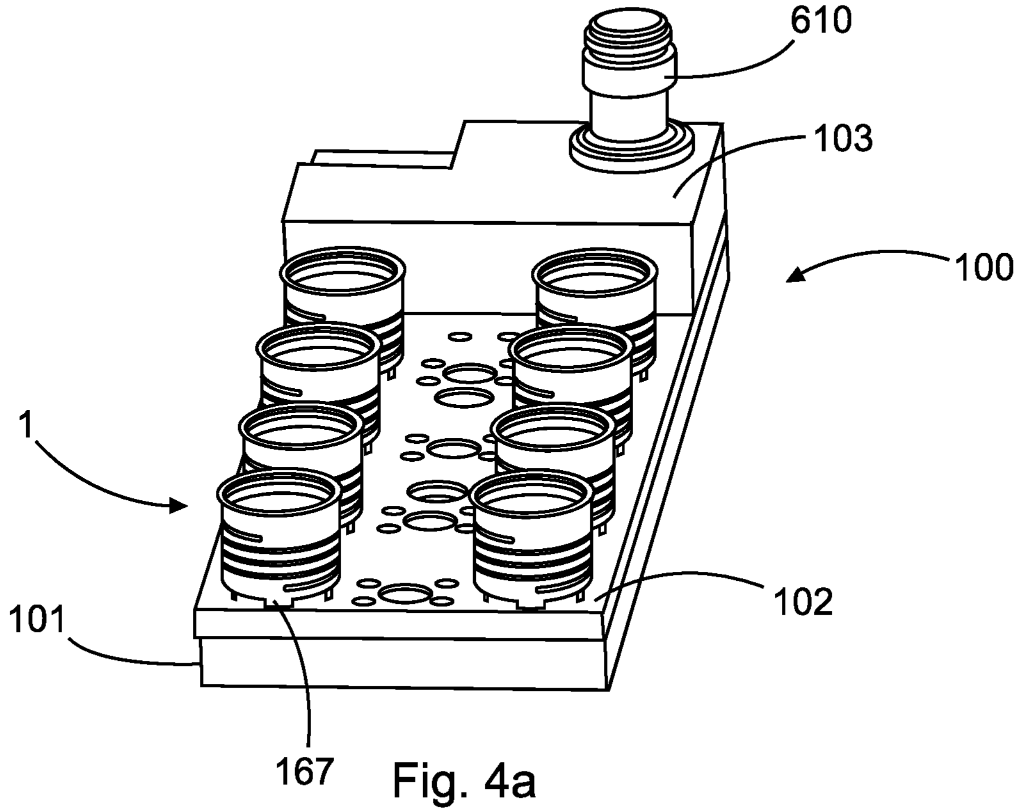
FIG. 4*a* shows an assembled signal distributing device without a plastics housing.

FIG. 4*a* shows an assembled signal distributing device without the plastics housing 600, that is the plastics housing 600 is obscured in this illustration. The shielding sleeves 1 actually arranged in the cylindrical recesses 60 are therefore illustrated as free-standing, although they are actually retained by the device connection part 6. On the device side, that is at the bottom in the drawing, the shielding sleeves 1 are placed on a respective connecting element 160, the contact tabs 167 of which are plugged through a respective contacting slot 107 in the cover 102 of the shielding housing 100.

The printed circuit board 9 is received in the shielding housing 100, that is to say is arranged between the bottom part 101 and the cover 102, and covered in the region of a power connection thereof by the shielding housing attachment 103.

Figure 4B:
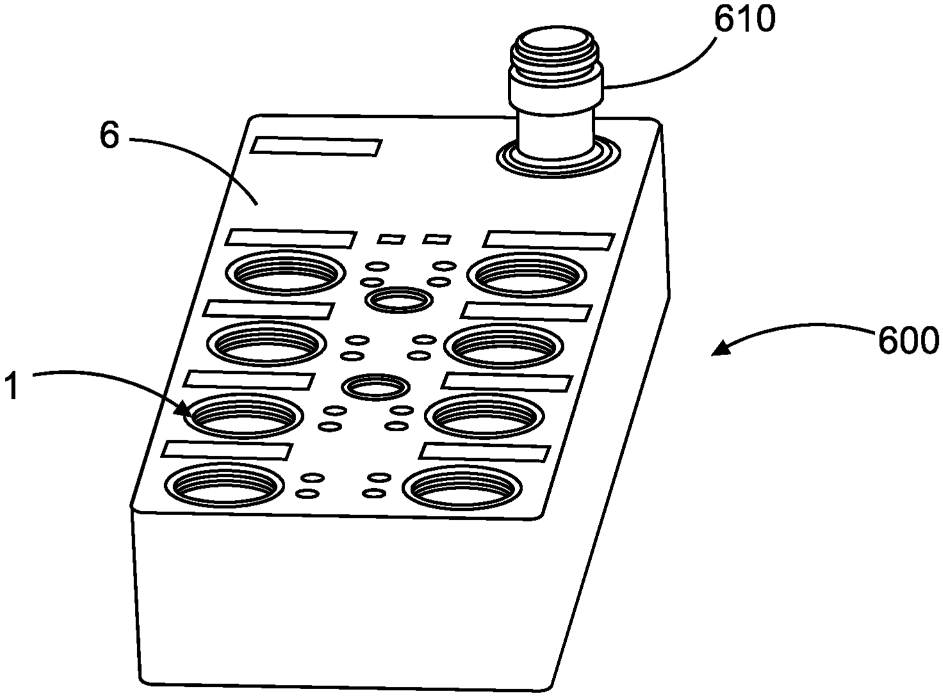
FIG. 4*b* shows an assembled signal distributing device with a plastics housing.

FIG. 4*b* shows the assembled signal distributing device with the plastics housing 600. It is clear from this how the shielding sleeves 1 are arranged in recessed fashion in the device connection part 6.

FIG. 5*a* shows a plug-in-side view of a device connection part 6 of the plastics housing 600, with a plug-in connector socket, arranged in the device connection part 6, of the signal distributing device. The plug-in connector socket has at least the shielding sleeve 1, the shielding cross 140 and a contact carrier 7 with eight continuous contact chambers 70, in which a respective plug-in contact 8 is received, it only being possible to see the plug-in region 80 of the respective plug-in contact 8 in this illustration. As a result of the segmenting, the contact carrier 7 has two intersecting slots, in which the shielding cross 140 is inserted in order to shield one plug-in contact pair from the other plug-in contact pairs. This is mentioned by way of example and is suitable for pure signal transmission in differential form. In other embodiments, the slot and the shielding element could have a different shape, for example a Y-shaped encoding, instead of the so-called “X-shaped encoding” shown here.

It can also be seen that the contact carrier 7 is connected to the device connection part 6 via an encircling connecting piece 76. The contact carrier 7 is thus formed in one piece with the device connection part 6.

Figure 5B:
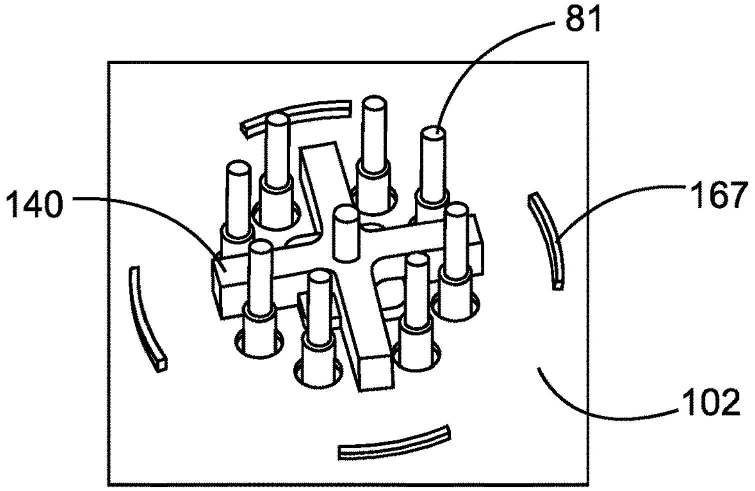
FIG. 5*b* shows a view from the inside of the device of a cover of a shielding housing with the plug-in connector socket.

FIG. 5*b* shows a view from the inside of the device of the cover 102 of the shielding housing 100. It can be clearly seen that the connection regions 81, in the form of connection pins, of the plug-in contacts 8 and the shielding cross 140 are plugged through the cover 102 at openings provided for this. The four contact tabs 167 are also plugged through contacting slots 107 in the cover 102 and are form- and force-fittingly retained therein and thus ensure secure earth contact with variable plug-in depth as tolerance compensation.

Figure 5C:
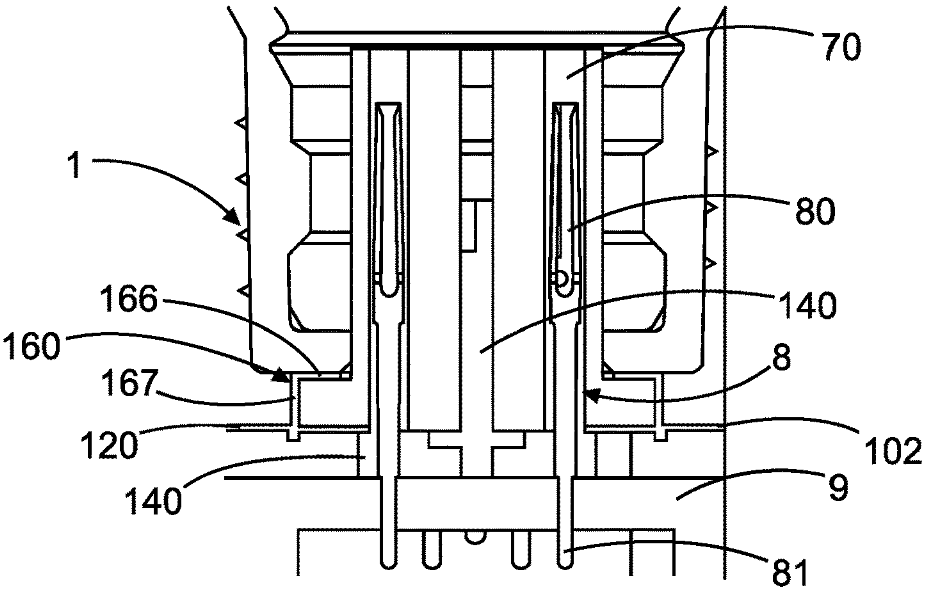
FIG. 5*c* shows a cross-sectional illustration through the plug-in connector socket.

FIG. 5*c* shows a cross-sectional illustration through the plug-in connector socket. This makes it clear how the connecting pins 81 of the plug-in contacts 8 project through the cover 102 of the shielding housing 100 in order to make electrical contact with conductor tracks of the printed circuit board 9. By contrast, the shielding cross 140 and the connecting element 160 make direct contact with the cover 120. The shielding sleeve 1 screwed in the cylindrical recess 60 in the housing connection part 6 presses on the contact ring 166 of the connecting element 160 on the device side (at the bottom in the drawing) and is electrically conductively connected to the shielding housing 100 via its contact tabs 167.

In this way, all shielding sleeves 1 of the signal distributing device are electrically conductively connected to the shielding housing and thus also to one another.

Figure 6A:
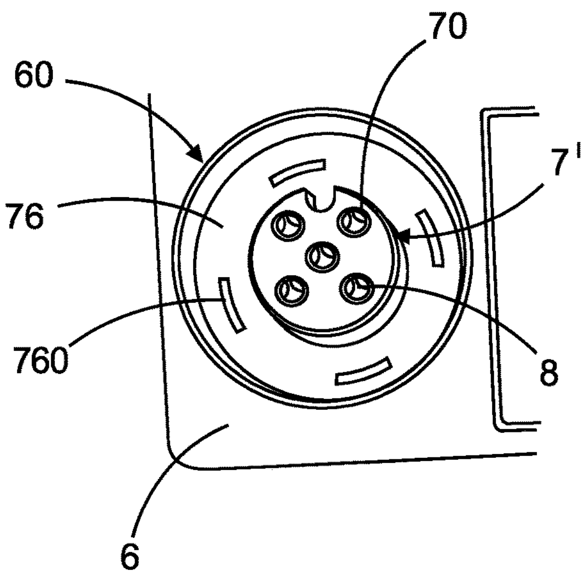
FIG. 6*a* shows a plug-in-side view of the device connection part with a plug-in connector socket.

FIG. 6*a* shows a plug-in-side view of the device connection part 6 with the plug-in connector socket in a different embodiment. The contact carrier 7' is also formed in one piece with the device connection part 6 and thus connected thereto here, specifically via an encircling device-side connecting piece 76, in which there are four connection through-openings. The essential differences in relation to the preceding illustration are that the contact carrier 7' shown here is not segmented and has only five contact chambers 70, and that the plug-in connector socket also has only five plug-in contacts 8 in the form of socket contacts and does not have a shielding cross 140.

Figure 6B:
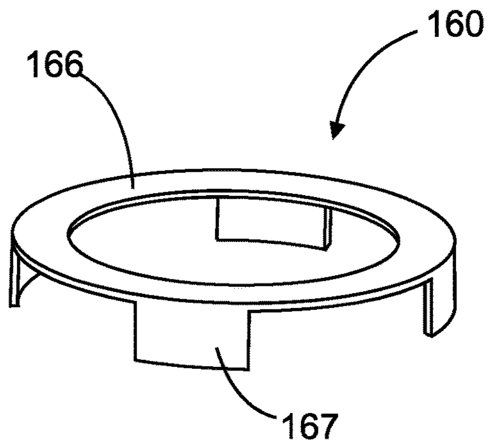
FIG. 6*b* shows a single connecting element.

FIG. 6*b* shows a single electrically conductive connecting element 160.

The electrically conductive connecting element 160 is in the form of a stamped and bent part and consists of a metal sheet. It has a planar, closed contact ring 166, on which, on the outside of which, four contact tabs 167 are arranged at equidistant intervals and are bent out of the ring plane. The contact tabs 167 are formed in one piece with the contact ring 166. During the production, they may be stamped out from a metal sheet without great complexity in one method step together with the contact ring 166 in a single stamping procedure, and subsequently bent out of the ring plane in a further step.

Figure 6C:
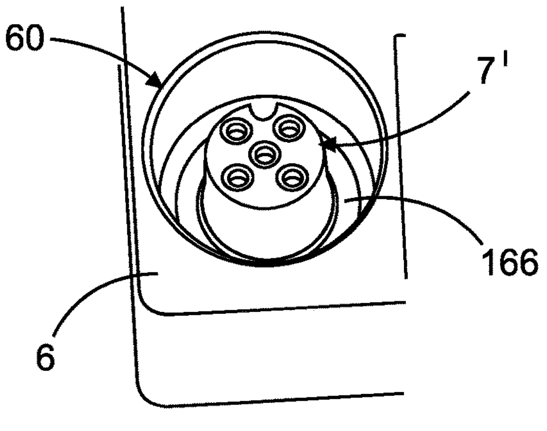
FIG. 6*c* shows the device connection part from the plug-in-side view with the connecting element inserted.
Figure 6D:
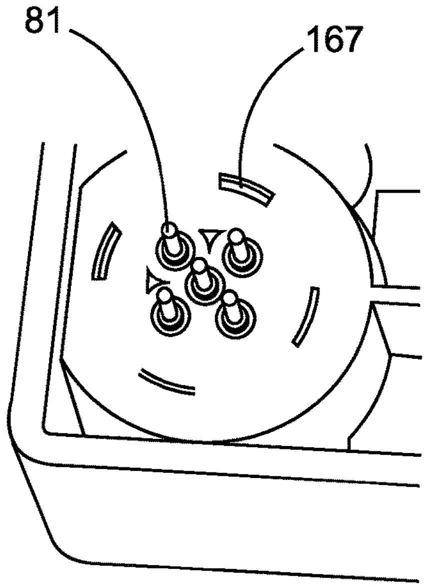
FIG. 6*d* shows a device-side view of the device connection part.

FIG. 6*c* shows the device connection part 6 from the plug-in-side view with the connecting element 160 inserted in the recess 6. The contact ring 166 of the connecting element 160 comes to lie on the connecting piece 76. The connecting element 160 passes through the connecting openings 760 in the connecting piece 76, as can be seen from the device-side view illustrated in FIG. 6*d*.

Figure 7A:
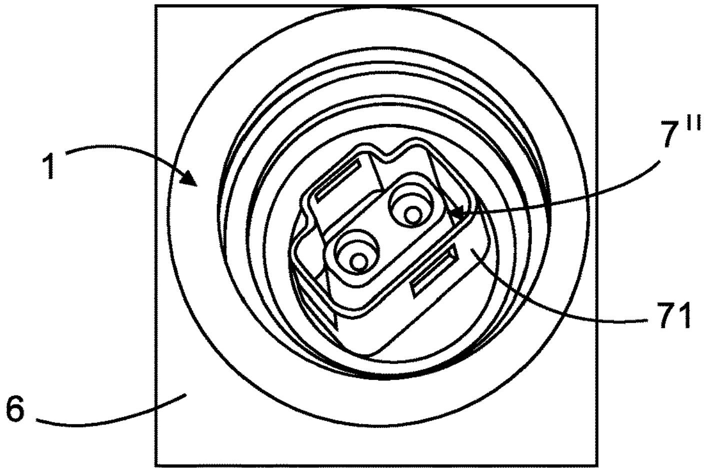
FIG. 7*a* shows a plug-in-side view of the device connection part with a two-pole plug-in connector socket.

Lastly, FIG. 7*a* shows a plug-in-side view of the device connection part 6 with a two-pole plug-in connector socket, the contact carrier 7" of which is surrounded by a shielding plate 71. Such a plug-in connector socket may, for example, be inserted in the technical surroundings of the two-pole ethernet.

Figure 7B:
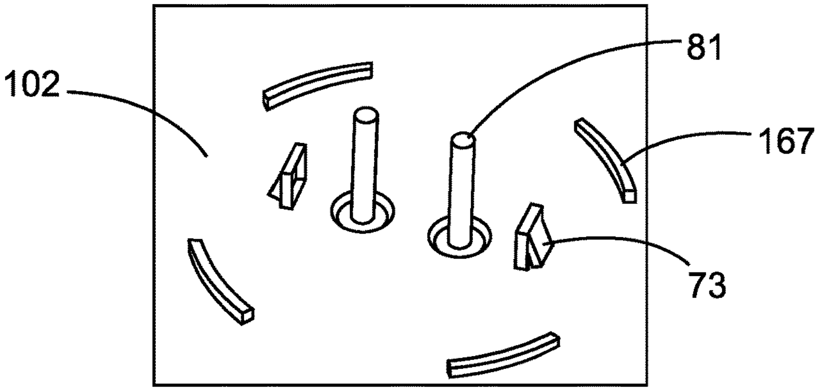
FIG. 7*b* shows a view from the inside of the device of the inner side of the cover of the shielding housing with the two-pole plug-in connector socket.
Figure 7C:
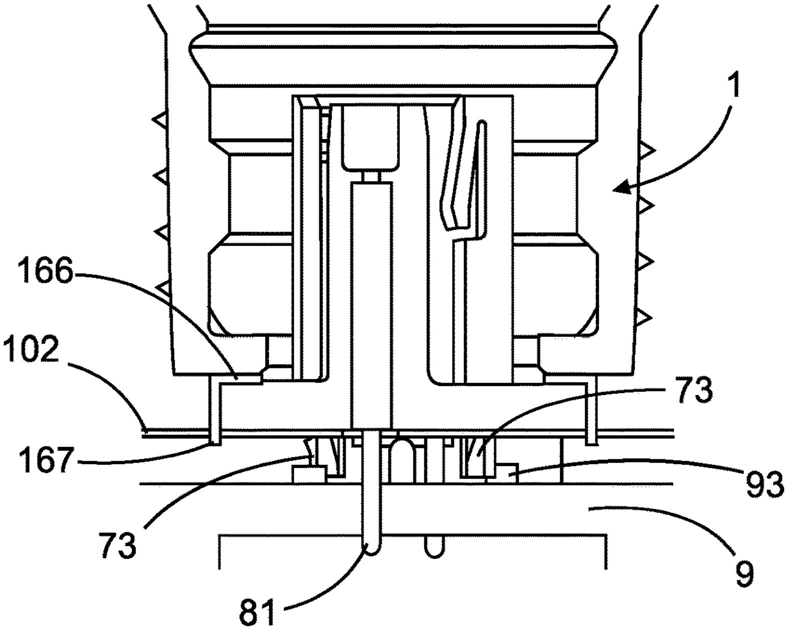
FIG. 7*c* shows a cross-sectional illustration through the two-pole plug-in connector socket.

FIG. 7*b* shows the corresponding view from the inside of the device of the inner side of the cover 102 of the shielding housing 100 with the two-pole plug-in connector socket. By contrast to the preceding embodiments, two snap-action hooks 73 passing through the shielding housing 100 at latching openings provided for this primarily stand out. In addition, the snap-action hooks 73 may be electrically conductive and thus establish an additional electrical earth connection between the shielding housing 100 and a respective earth connection 93 of the printed circuit board 9.

Even though various aspects or features of embodiments of the disclosure are respectively shown in combination in the Figures, it is clear to those skilled in the art that—unless otherwise stated—the combinations shown and discussed are not the only ones possible. In particular, mutually corresponding units or complexes of features from different exemplary embodiments can be exchanged with one another. In other words, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electric signal distributing device, comprising:

a plastics housing;

at least one plug-in connector socket, which has a contact carrier with at least one continuous contact chamber and has at least one electric plug-in contact which is at least partially received in the at least one continuous contact chamber and retained therein, wherein the at least one electric plug-in contact has a plug-in-side end with a plug-in region for plug-in-side connection to at least one mating contact of a mating plug connector plugged in the at least one plug-in connector socket and has a connection-side end with a connection region;

a circuit carrier, which is arranged in the plastics housing and has at least one conductor track, which is electrically conductively connected to the connection region of the at least one plug-in contact;

wherein the plastics housing has a device connection part, wherein the device connection part has at least one cylindrical recess, wherein the at least one cylindrical recess has an inside diameter, and wherein the at least one contact carrier is arranged in the at least one cylindrical recess in the device connection part; and a shielding unit, which comprises at least one metallic shielding sleeve with a hollow-cylindrical basic shape having an outside diameter which substantially corresponds to the inside diameter of the cylindrical recess, a shielding housing arranged inside the plastics housing and encloses the circuit carrier, and at least one electrically conductive connecting element, which projects downwardly from the device connection part to electrically conductively connect a respective one of the at least one metallic shielding sleeve to the shielding housing located inside the plastics housing.

2. The electric signal distributing device as claimed in claim 1, wherein the at least one contact carrier is formed in one piece with the device connection part.

3. The electric signal distributing device as claimed in claim 1, wherein the shielding sleeve is a one-piece turned part consisting of metal.

4. The electric signal distributing device as claimed in claim 1, wherein the at least one electrically conductive connecting element is at least partially arranged in the at least one cylindrical recess in the device connection part and electrically conductively connected to the at least one shielding sleeve.

5. An electric signal distributing device, comprising:

a plastics housing;

at least one plug-in connector socket, which has a contact carrier with at least one continuous contact chamber and has at least one electric plug-in contact which is at least partially received in the at least one continuous contact chamber and retained therein, wherein the at least one electric plug-in contact has a plug-in-side end with a plug-in region for plug-in-side connection to at least one mating contact of a mating plug connector plugged in the at least one plug-in connector socket and has a connection-side end with a connection region;

a circuit carrier, which is arranged in the plastics housing and has at least one conductor track, which is electrically conductively connected to the connection region of the at least one plug-in contact;

wherein the plastics housing has a device connection part, wherein the device connection part has at least one cylindrical recess, wherein the at least one cylindrical recess has an inside diameter, and wherein the at least one contact carrier is arranged in the at least one cylindrical recess in the device connection part; and a shielding unit, which comprises at least one metallic shielding sleeve with a hollow-cylindrical basic shape having an outside diameter which substantially corresponds to the inside diameter of the cylindrical recess, a shielding housing arranged inside the plastics housing and encloses the circuit carrier, and at least one electrically conductive connecting element, which projects from the device connection part on a device inner side and electrically conductively connects a respective one of the at least one metallic shielding sleeve to the shielding housing, and wherein a self-tapping external thread of the at least one shielding sleeve is screwed in the at least one cylindrical recess in the device connection part.

6. The electric signal distributing device as claimed in claim 5, wherein the at least one contact carrier is formed in one piece together with the device connection part.

7. An electric signal distributing device, comprising:

a plastics housing;

at least one plug-in connector socket, which has a contact carrier with at least one continuous contact chamber and has at least one electric plug-in contact which is at least partially received in the at least one continuous contact chamber and retained therein, wherein the at least one electric plug-in contact has a plug-in-side end with a plug-in region for plug-in-side connection to at least one mating contact of a mating plug connector plugged in the at least one plug-in connector socket and has a connection-side end with a connection region;

a circuit carrier, which is arranged in the plastics housing and has at least one conductor track, which is electrically conductively connected to the connection region of the at least one plug-in contact;

wherein the plastics housing has a device connection part, wherein the device connection part has at least one cylindrical recess, wherein the at least one cylindrical recess has an inside diameter, and wherein the at least one contact carrier is arranged in the at least one cylindrical recess in the device connection part; and a shielding unit, which comprises at least one metallic shielding sleeve with a hollow-cylindrical basic shape having an outside diameter which substantially corresponds to the inside diameter of the cylindrical recess, a shielding housing arranged inside the plastics housing and encloses the circuit carrier, and at least one electrically conductive connecting element, which projects from the device connection part on a device inner side and electrically conductively connects a respective one of the at least one metallic shielding sleeve to the shielding housing, and wherein the at least one connecting element has a planar, closed contact ring and at least one contact tab, which is arranged on a periphery of the contact ring and projects out of a ring plane of the contact ring.

8. The electric signal distributing device as claimed in claim 7, wherein at least three contact tabs are arranged at equidistant intervals on an outer edge of the contact ring.

9. The electric signal distributing device as claimed in claim 7, wherein the connecting element is in the form of a stamped and bent part, wherein the at least one contact tab together with the contact ring is stamped out from a metal sheet and the at least one contact tab is bent out of the ring plane of the contact ring.

10. An electric signal distributing device, comprising:

a plastics housing;

at least one plug-in connector socket, which has a contact carrier with at least one continuous contact chamber and has at least one electric plug-in contact which is at least partially received in the at least one continuous contact chamber and retained therein, wherein the at least one electric plug-in contact has a plug-in-side end with a plug-in region for plug-in-side connection to at least one mating contact of a mating plug connector plugged in the at least one plug-in connector socket and has a connection-side end with a connection region;

a circuit carrier, which is arranged in the plastics housing and has at least one conductor track, which is electrically conductively connected to the connection region of the at least one plug-in contact;

wherein the plastics housing has a device connection part, wherein the device connection part has at least one cylindrical recess, wherein the at least one cylindrical recess has an inside diameter, and wherein the at least one contact carrier is arranged in the at least one cylindrical recess in the device connection part; and a shielding unit, which comprises at least one metallic shielding sleeve with a hollow-cylindrical basic shape having an outside diameter which substantially corresponds to the inside diameter of the cylindrical recess, a shielding housing arranged inside the plastics housing and encloses the circuit carrier, and at least one electrically conductive connecting element, which projects from the device connection part on a device inner side and electrically conductively connects a respective one of the at least one metallic shielding sleeve to the shielding housing, and wherein the at least one contact carrier is substantially cylindrical and has a diameter which is smaller than the inside diameter of the at least one cylindrical recess, wherein the at least one contact carrier is arranged concentrically in the at least one cylindrical recess.

11. The electric signal distributing device as claimed in claim 10, wherein the contact ring of the at least one connecting element has an outside diameter which is smaller than the inside diameter of the at least one cylindrical recess and has an inside diameter which is larger than the inside diameter of the at least one cylindrical contact carrier.

12. The electric signal distributing device as claimed in claim 10, wherein the at least one contact carrier has an encircling, annular connecting piece, via which the at least one contact carrier is connected to the housing connection part.

13. The electric signal distributing device as claimed in claim 12, wherein the contact ring of the at least one connecting element is arranged on the connecting piece of the at least one contact carrier and form-fittingly retained between an outer wall of the cylindrical recess and the cylindrical contact carrier on the device connection part in the respective cylindrical recess in order to make electrical contact with the shielding sleeve.

14. The electric signal distributing device as claimed in claim 13, wherein, in or on the connecting piece of the at least one contact carrier, the device connection part has at least one connection through-opening, through which the at least one contact tab of the at least one connecting element projects in order to make electrical contact with the shielding housing on the device inner side.

15. The electric signal distributing device as claimed in claim 14, wherein the shielding housing has at least one contacting slot, through which the at least one contact tab of the at least one connecting element is plugged in order to make electrical contact with the shielding housing on the connection side and at the same time ensure mechanical tolerance compensation between the device connection part and the shielding housing.

* * * * *